United States Patent
Brylyn

(10) Patent No.: US 9,141,613 B2
(45) Date of Patent: Sep. 22, 2015

(54) SYSTEMS AND METHODS FOR DETERMINING AN ADDRESS FOR A PRIVATE FUNCTION

(71) Applicant: AppSense Limited

(72) Inventor: David Brylyn, Warrington (GB)

(73) Assignee: AppSense Limited, Warrington (GB)

( * ) Notice: Subject to any disclaimer, the term of this patent is extended or adjusted under 35 U.S.C. 154(b) by 30 days.

(21) Appl. No.: 13/663,958

(22) Filed: Oct. 30, 2012

(65) Prior Publication Data

US 2014/0122454 A1    May 1, 2014

(51) Int. Cl.
G06F 17/30 (2006.01)
G06F 9/45 (2006.01)

(52) U.S. Cl.
CPC ............ *G06F 17/30011* (2013.01); *G06F 8/53* (2013.01)

(58) Field of Classification Search
CPC .................................................. G06F 17/30864
USPC ......... 707/705, 713, 703, 710, 748, 770, 707, 707/732, 738
See application file for complete search history.

(56) References Cited

U.S. PATENT DOCUMENTS

| | | | |
|---|---|---|---|
| 5,953,419 A * | 9/1999 | Lohstroh et al. | 713/165 |
| 6,907,505 B2 * | 6/2005 | Cochran et al. | 711/162 |
| 7,020,774 B1 * | 3/2006 | Cornuejols et al. | 713/176 |
| 7,299,358 B2 * | 11/2007 | Chateau et al. | 713/176 |
| 7,571,448 B1 | 8/2009 | Sallam | |
| 8,341,133 B2 * | 12/2012 | Detlefs et al. | 707/703 |
| 2002/0120824 A1 * | 8/2002 | Hooper, III | 711/202 |
| 2004/0153918 A1 * | 8/2004 | Tanaka et al. | 714/724 |
| 2006/0271915 A1 * | 11/2006 | Stefik et al. | 717/127 |
| 2007/0033275 A1 * | 2/2007 | Toivonen et al. | 709/224 |
| 2009/0013399 A1 * | 1/2009 | Cottrell et al. | 726/12 |
| 2009/0225463 A1 * | 9/2009 | Itoh et al. | 360/55 |
| 2011/0131657 A1 | 6/2011 | Nojiri | |
| 2011/0137889 A1 * | 6/2011 | Nayberg | 707/713 |
| 2012/0066378 A1 * | 3/2012 | Lui et al. | 709/224 |
| 2013/0111605 A1 * | 5/2013 | Maeda et al. | 726/27 |
| 2013/0227196 A1 * | 8/2013 | Zheng et al. | 711/103 |

FOREIGN PATENT DOCUMENTS

| | | |
|---|---|---|
| EP | 0 883 060 A2 | 12/1998 |
| KR | 2000-0046328 | 7/2000 |
| WO | WO-2011/068967 | 6/2011 |

OTHER PUBLICATIONS

AppSense release, AppSense Application Manager 8.3, "AppSense continues to deliver significant new features and enhancements", www.myappsense.com, 3 pages.
Dhondt, Wouter, "Finding crash information using the MAP file", Jan. 5, 2003, http://www.codeproject.com/Articles/3472/Finding-crash-information-using-the-MAP-file, 13 pages.
http://stackoverflow.com/questions/3526597/current-function-address-x64, Aug. 2010, 2 pages.

* cited by examiner

*Primary Examiner* — Mariela Reyes
*Assistant Examiner* — Thong Vu
(74) *Attorney, Agent, or Firm* — Wilmer Cutler Pickering Hale and Dorr LLP

(57) ABSTRACT

Systems and methods are provided for determining an address for a private function. A start address for a public function of a software program in a data file associated with the software program is determined. Instruction data for the public function is identified in the data file based on the start address of the public function. First data of a predetermined size is read from a beginning of the instruction data for the public function. A signature for a private function of the software program is identified in the first data. A relative address for the private function in the data file based on the identified signature is stored in memory.

18 Claims, 5 Drawing Sheets

```
urlmon!CoGetClassObjectFromURL:
762acc63 8bff      mov   edi,edi
762acc65 55        push  ebp
762acc66 8bec      mov   ebp,esp
762acc68 6a00      push  0
762acc6a ff752c    push  dword ptr [ebp+2Ch]
762acc6d ff7528    push  dword ptr [ebp+28h]
762acc70 ff7524    push  dword ptr [ebp+24h]
762acc73 ff7520    push  dword ptr [ebp+20h]
762acc76 ff751c    push  dword ptr [ebp+1Ch]
762acc79 ff7518    push  dword ptr [ebp+18h]
762acc7c ff7514    push  dword ptr [ebp+14h]
762acc7f ff7510    push  dword ptr [ebp+10h]
762acc82 ff750c    push  dword ptr [ebp+0Ch]
762acc85 ff7508    push  dword ptr [ebp+8]
762acc88 e89d7cfcff call urlmon!CoGetClassObjectFromURLInternal (7627492a)
762acc8d 5d        pop   ebp
762acc8e c22800    ret   28h
762acc91 90        nop
```

FIG. 4

```
urlmon!CoGetClassObjectFromURLInternal:
7627492a 8bff           mov    edi,edi
7627492c 55             push   ebp
7627492d 8bec           mov    ebp,esp
7627492f 83e4f8         and    esp,0FFFFFFF8h
76274932 b8b4100000     mov    eax,10B4h
76274937 e850a7fdff     call   urlmon!_chkstk (7624f08c)
7627493c a144c02d76     mov    eax,dword ptr [urlmon!__security_cookie (762dc044)]
76274941 33c4           xor    eax,esp
76274943 898424b0100000 mov    dword ptr [esp+10B0h],eax
7627494a 8b4508         mov    eax,dword ptr [ebp+8]
7627494d 8b5528         mov    edx,dword ptr [ebp+28h]
76274950 8b4d24         mov    ecx,dword ptr [ebp+24h]
76274953 53             push   ebx
76274954 8b5d0c         mov    ebx,dword ptr [ebp+0Ch]
76274957 56             push   esi
76274958 8b7518         mov    esi,dword ptr [ebp+18h]
```

FIG. 5

SYSTEMS AND METHODS FOR DETERMINING AN ADDRESS FOR A PRIVATE FUNCTION

TECHNICAL FIELD

Embodiments of the invention generally relate to determining an address for a private function.

BACKGROUND

In computer programming, the term hooking generally refers to various techniques that are used to intercept function calls (or messages, events, etc.) passed between computer executables. The computer code that handles the interception is called a hook. Such interception can be used to augment the behavior of operating systems, applications, and/or other software components through separate software programs. For example, a software program can hook to a function call in a separate software program so that when the function call is executed, the software program can prevent the function from executing during run time, change the behavior of the function (e.g., by augmenting the function with additional code), or replace the function with a new function.

Various libraries and products have been developed to hook to public functions and/or events defined through application programmer interfaces ("APIs"). However, such products often only can hook to publicly exported functions (e.g., well-defined API functions). For example, library data files (e.g., byte code) often include export tables that define the public functions and provide address information for the public functions in the file. The hooking programs can use the export tables to identify the addresses of the publicly exported functions (which are, in turn, used to hook to the functions). However, internal functions are not defined in the export tables, so conventional hooking methods often have no easy way to determine the start addresses of the internal functions (or private functions) in the byte code. Further, because internal functions are not easily identifiable, the addresses of such internal functions may not be known at compile time of the program that needs to hook to the internal functions. It is often required for such programs to know the addresses of the internal functions at compile time for the programs to hook to the function.

SUMMARY

In accordance with the disclosed subject matter, systems, methods, and non-transitory computer-readable media are provided for identifying the address of internal functions (e.g., private functions) in byte code. In some embodiments, the private function addresses can be used to hook to the private functions.

The disclosed subject matter includes a computerized method for determining an address of a private function. A computing device determines a start address for a public function of a software program in a data file associated with the software program. The computing device identifies instruction data for the public function in the data file based on the start address of the public function. The computing device reads first data of a predetermined size from a beginning of the instruction data for the public function. The computing device identifies a signature for a private function of the software program in the first data. The computing device stores, in memory, a relative address for the private function in the data file based on the identified signature.

The disclosed subject matter further includes a server for determining an address of a private function. The server includes a database. The server includes a processor in communication with the database, and configured to run a module stored in memory that is configured to cause the processor to determine a start address for a public function of a software program in a data file in the database associated with the software program. The module stored in memory is configured to identify instruction data for the public function in the data file based on the start address of the public function. The module stored in memory is configured to read first data of a predetermined size from a beginning of the instruction data for the public function. The module stored in memory is configured to identify a signature for a private function of the software program in the first data. The module stored in memory is configured to store, in the memory, a relative address for the private function in the data file based on the identified signature.

The disclosed subject matter further includes a non-transitory computer readable medium having executable instructions operable to cause an apparatus to determine a start address for a public function of a software program in a data file associated with the software program. The instructions operable to cause an apparatus to identify instruction data for the public function in the data file based on the start address of the public function. The instructions operable to cause an apparatus to read first data of a predetermined size from a beginning of the instruction data for the public function. The instructions operable to cause an apparatus to identify a signature for a private function of the software program in the first data. The instructions operable to cause an apparatus to store, in memory, a relative address for the private function in the data file based on the identified signature.

The techniques disclosed herein can locate and use (hook) an internal private function (e.g., where there is no associated public function). By dynamically searching for the address of the internal function, the address of the private function is not required at compile time of the hooking software. Further, the data files that are searched to identify the internal function addresses can change without affecting the search process.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIG. 4 is an exemplary diagram of assembly instructions for a known public function, in accordance with some embodiments; and FIG. 5 is an exemplary diagram of a portion of assembly instructions for a private function, in accordance with some embodiments.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

The disclosed techniques enable run time identification of an internal functions' address in byte code. A predefined set of data points (e.g., including a signature of the internal function) can be used to search a known exported function in a data file (e.g., such as a DLL file) for the address of an internal function (e.g., which is called by the known exported function). This search continues in the code of the target exported function until the match is made, or another predefined set of data points (e.g., representative of the end of the exported function) is matched, indicating that the end of the function has been encountered without locating the address of the internal function.

By searching for the address of the internal (or private) function based on the predefined data points, the address can be identified even if the data files change (e.g., for service patches, hot fixes, etc.). Such dynamic searching can be more beneficial than, for example, using a predetermined offset from the beginning of the data file to identify the private function, because if the data file changes, then the offset may no longer be valid. Once the address of the private function is identified, software can hook to the private function by placing a hook at the address in the data file (e.g., in the DLL file).

Figure 1:
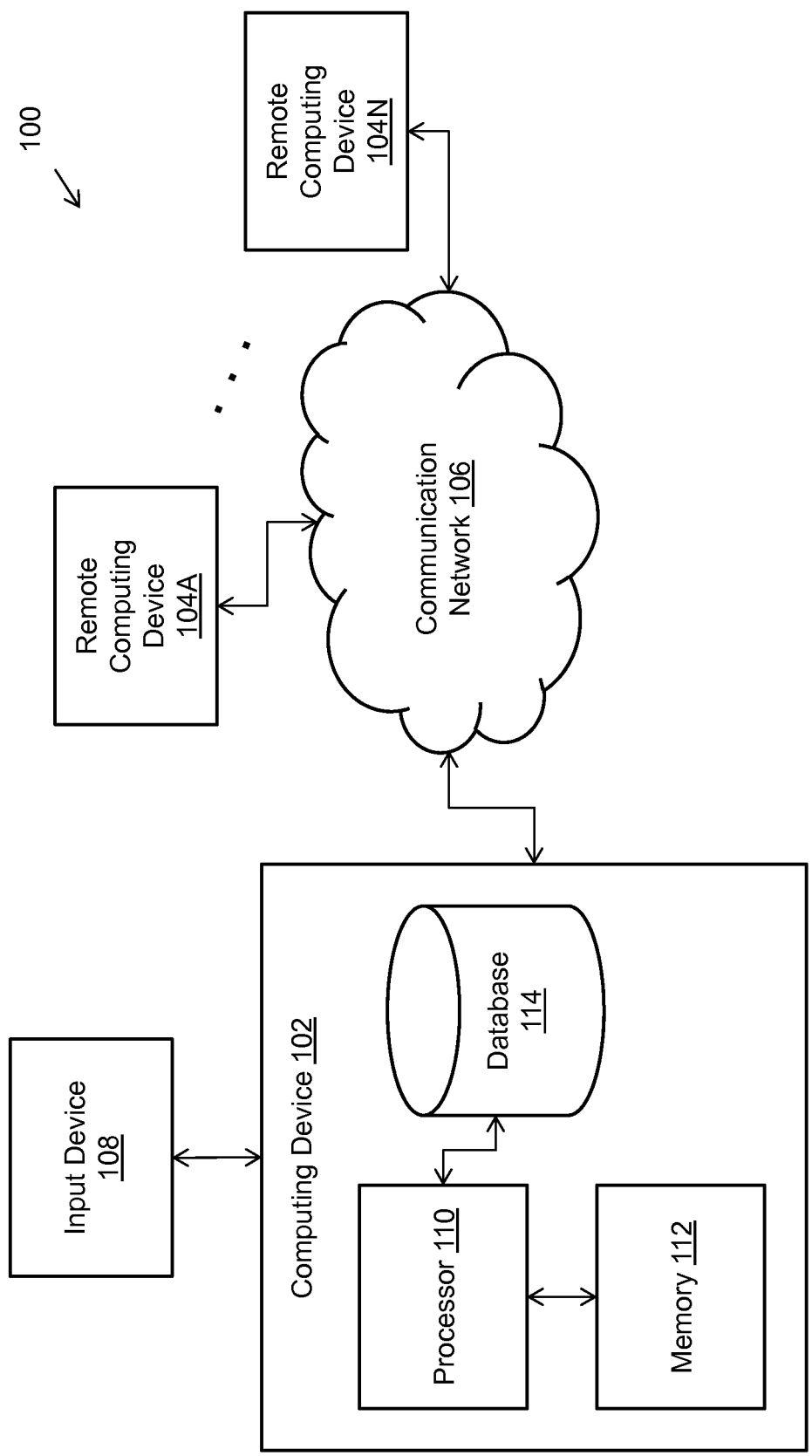
FIG. 1 is an exemplary diagram of a system in accordance with some embodiments.

FIG. 1 is an exemplary diagram of a system 100 in accordance with some embodiments. System 100 includes computing device 102. Computing device 102 is in communication with remote computing device 104A through 104N (collectively, remote computing device 104) through communication network 106. Computing device 102 is in communication with input device 108. Computing device 102 includes processor 110, memory 112, and database 114. Processor 110 is in communication with memory 112 and database 114.

The communication network 106 can include a network or combination of networks that can accommodate private data communication. For example, the communication network 106 can include a local area network (LAN), a private cellular network, a private telephone network, a private computer network, a private packet switching network, a private line switching network, a private wide area network (WAN), or any number of private networks that can be referred to as an Intranet. Such networks may be implemented with any number of hardware and software components, transmission media and network protocols. FIG. 1 shows the network 106 as a single network; however, the network 106 can include multiple interconnected networks listed above.

Processor 110 can be configured to implement the functionality described herein using computer executable instructions stored in a temporary and/or permanent non-transitory memory such as memory 112. Memory 112 can be flash memory, a magnetic disk drive, an optical drive, a programmable read-only memory (PROM), a read-only memory (ROM), or any other memory or combination of memories. The processor 110 can be a general purpose processor and/or can also be implemented using an application specific integrated circuit (ASIC), programmable logic array (PLA), field programmable gate array (FPGA), and/or any other integrated circuit. Similarly, database 114 may also be flash memory, a magnetic disk drive, an optical drive, a programmable read-only memory (PROM), a read-only memory (ROM), or any other memory or combination of memories. The computing device 102 can execute an operating system that can be any operating system, including a typical operating system such as Windows, Windows XP, Windows 7, Windows 8, Windows Mobile, Windows Phone, Windows RT, Mac OS X, Linux, VXWorks, Android, Blackberry OS, iOS, Symbian, or other OSs.

The components of system 100 can include interfaces (not shown) that can allow the components to communicate with each other and/or other components, such as other devices on one or more networks, server devices on the same or different networks, or user devices either directly or via intermediate networks. The interfaces can be implemented in hardware to send and receive signals from a variety of mediums, such as optical, copper, and wireless, and in a number of different protocols some of which may be non-transient.

The software in computing device 102 can be divided into a series of tasks that perform specific functions. These tasks can communicate with each other as desired to share control and data information throughout computing device 102 (e.g., via defined APIs). A task can be a software process that performs a specific function related to system control or session processing. In some embodiments, three types of tasks can operate within computing device 102: critical tasks, controller tasks, and manager tasks. The critical tasks can control functions that relate to the server's ability to process calls such as server initialization, error detection, and recovery tasks. The controller tasks can mask the distributed nature of the software from the user and perform tasks such as monitoring the state of subordinate manager(s), providing for intra-manager communication within the same subsystem (as described below), and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem can be a software element that either performs a specific task or is a culmination of multiple other tasks. A single subsystem can include critical tasks, controller tasks, and manager tasks. Some of the subsystems that run on computing device 102 include a system initiation task subsystem, a high availability task subsystem, a shared configuration task subsystem, and a resource management subsystem.

The system initiation task subsystem can be responsible for starting a set of initial tasks at system startup and providing individual tasks as needed. The high availability task subsystem can work in conjunction with the recovery control task subsystem to maintain the operational state of computing device 102 by monitoring the various software and hardware components of computing device 102. Recovery control task subsystem can be responsible for executing a recovery action for failures that occur in computing device 102 and receives recovery actions from the high availability task subsystem. Processing tasks can be distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will preferably not be affected by that problem.

A shared configuration task subsystem can provide the computing device 102 with an ability to set, retrieve, and receive notification of server configuration parameter changes and is responsible for storing configuration data for the applications running within the computing device 102. A resource management subsystem can be responsible for assigning resources (e.g., processor and memory capabilities) to tasks and for monitoring the task's use of the resources.

In some embodiments, computing device 102 can reside in a data center and form a node in a cloud computing infrastructure. Computing device 102 can also provide services on demand such as Kerberos authentication, HTTP session establishment and other web services, and other services. A module hosting a client can be capable of migrating from one server to another server seamlessly, without causing program faults or system breakdown. A computing device 102 in the cloud can be managed using a management system.

Figure 2:
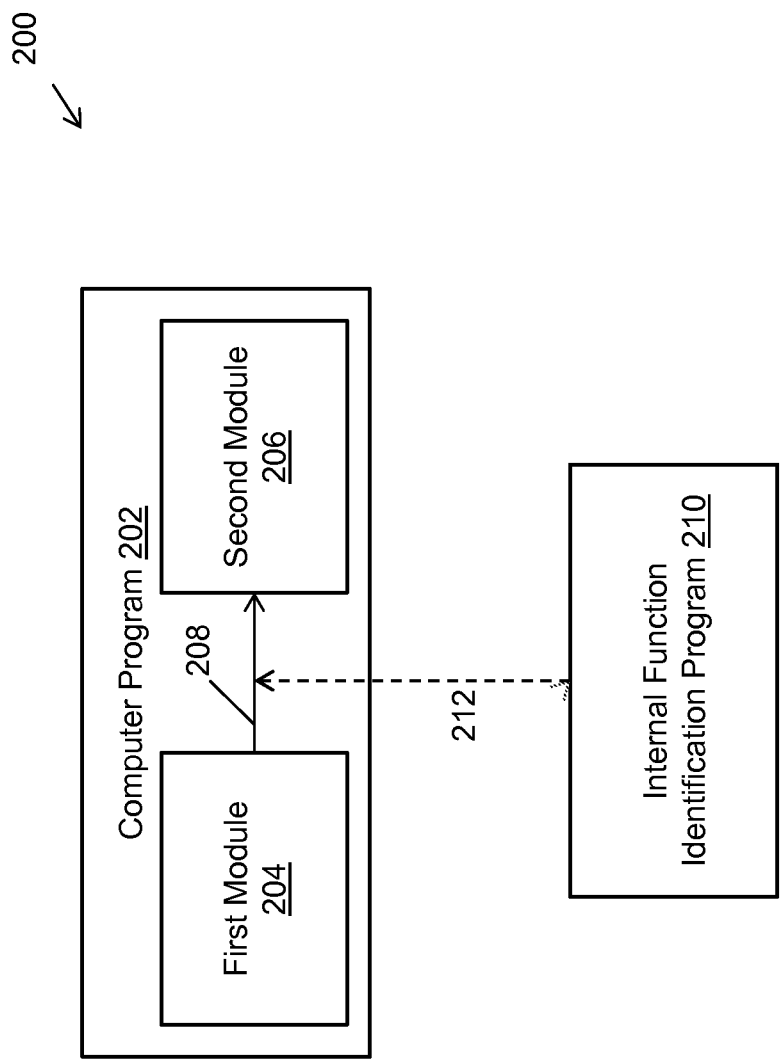
FIG. 2 is an exemplary diagram of an internal function identification program configured to identify an address for an internal function of a computer program, in accordance with some embodiments.

FIG. 2 is an exemplary diagram 200 of an internal function identification program 210 configured to identify an address for an internal function 208 of a computer program 202, in accordance with some embodiments. Referring to FIG. 1, for example, the computing device 102 executes computer program 202. Program 202 includes first module 204 and second module 206. First module 204 and second module 206 can be, for example, different executables, software threads, function calls, and/or other portions of program 202. In some examples, first module 204 and second module 206 can both be executed on one computing device. Alternatively, in some embodiments, the first module 204 is executed on one computing device (e.g., computing device 102), and the second module 206 is executed on a different computing device (e.g., remote computing device 104A). First module 204 executes an internal function 208 which communicates data from first module 204 to second module 206. The internal function 208 is, for example, a private function that is not publicly defined by program 202 (e.g., in an export table for a DLL file). The internal function identification program 210 includes code that, when executed (e.g., by computing device 102), is configured to identify the address of internal function 208 in a data file (as shown by arrow 212).

The example shown in FIG. 2 is intended to be illustrative only. For example, computer program 202 may only include first module 204, or it may include three or more modules (e.g., different software threads, executables, etc.). Further, for example, internal function 208 need not communicate with a different module (e.g., the internal function may perform tasks internal to a particular module, such as a mathematical calculation, rather than communicate with second module 206). As another example, the internal function identification program 210 can be a module of computing device 102 (e.g., an operating system module).

Computer program 202 can store (or include) information on exported functions in a single file (e.g., one library file for program 202), in separate files for each module (e.g., a library file for first module 204, and a library file for second module 206), and/or the like. The information for the exported functions includes data sufficient for other software to identify the addresses of the exported functions. For example, other software programs can hook to an exported function by using the stored information to determine the addresses of the private function.

However, computer program 202 does not include address information for private or internal functions (e.g., including internal function 208). The internal function identification program 210 can calculate such information for internal function 208 so that programs can still hook to internal function 208 (e.g., by using the data calculated by the internal function identification program 210).

Figure 3:
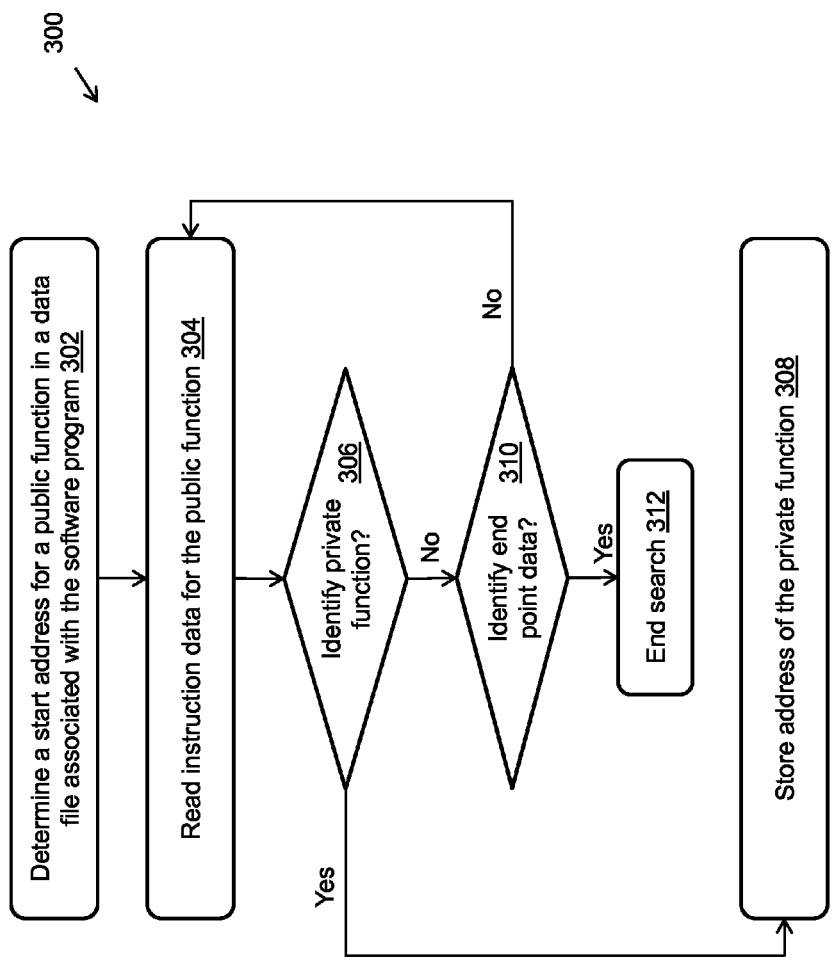
FIG. 3 is an exemplary diagram of a computerized method for finding the address of a private function, in accordance with some embodiments.

FIG. 3 is an exemplary diagram of a computerized method 300 for finding the address of a private function (e.g., the address of internal function 208), in accordance with some embodiments. At step 302 a computing device determines a start address for a public function of computer program (e.g., computer program 202) in a data file associated with the computer program (e.g., by executing the internal function identification program 210). The public function can be associated with the private function (e.g., it can include a function call to the private function). At step 304, the computing device reads instruction data for the public function from the data file. At step 306, the computing device searches for data indicative of an internal function (e.g., internal function 208). If the computing device identifies the internal function, the method 300 proceeds to step 308 and stores the address of the internal function (e.g., by storing (or maintaining) the address in memory, and/or writing the address to an external database). If the computing device does not identify the internal function, the method 300 proceeds to step 310. At step 310, the computing device searches for data indicative of the end of the public function. If the computing device does not identify the end of the public function, the method 300 proceeds back to step 304 and continues, as described above. If the computing device identifies the end of the public function, the method 300 proceeds to step 312 and terminates the method 300.

FIG. 4 is an exemplary diagram of assembly instructions 400 for a known public function in accordance with some embodiments. For ease of illustration, computerized method 300 will be explained with reference to FIG. 4. The assembly instructions 400 include an address 402 for the public function CoGetClassObjectFromURL, a signature pattern 406 for the private function call to CoGetClassObjectFromURLInternal, the address of the private function 408, and end characters 410 that indicate the end of the public function. The exemplary assembly instructions 400 are taken from the 32 bit version of urlmon.dll on a Microsoft Windows 7 system, file version 9.0.8112.16450. The assembly instructions 400 are for the known public function CoGetClassObjectFromURL (e.g., determined based on the export table in the urlmon.dll). For ease of explanation, the windbg debugger was used to format this information by using the 'u' command.

Referring to step 302 of FIG. 3, the computing device determines the start address of the exported function in a data file associated with the computer program. For example, as described herein, the data file can include a table that lists a set of exported functions for the software program, and provides address information for each exported function in the data file. In some embodiments, the computing device can determine the start address of the exported function using an API function. For example, the computing device can use the 'GetProcAddress' function, which retrieves the address of an exported function or variable from a specified dynamic-link library (DLL). Referring to FIG. 4, for example, the address returned by the GetProcAddress API function for the known public function CoGetClassObjectFromURL in the urlmon.dll file is $762acc63_{16}$ (indicated with reference character 402). For clarity, hexadecimal numbers are marked with the subscript "$_{16}$", where base 10 numbers are not marked with a subscript. While the GetProcAddress is used as an example, one of ordinary skill in the art can appreciate that any method can be used to determine the address of the public function.

Referring to step 304, the computing device uses the start address for the public function to identify instruction data for the public function in the data file. The computing device reads a predetermined amount of data from the beginning of the instruction data. In some embodiments, the predetermined size is calculated based on an identifier for the internal function (which is described further with respect to step 306). For example, the computing device can store such an identifier, and calculate (or update, etc.) the predetermined size based on the identifier. Referring to FIG. 4, for example, the second column 404 contains the byte code that the computing device searches to identify the private function. For this example, the signature pattern for the private function is four bytes: "ff,75,08,e8." The predetermined amount of data read from the file can be four bytes (e.g., the same number of bytes as the signature pattern), eight bytes (e.g., twice the number of bytes as the signature pattern), etc. In other examples, the size of the signature pattern can be a different length (e.g., more or less than four bytes). For example, any additional number of the previous push statements could be included as part of the signature.

In some embodiments, the computing device reads a large set of the published function instruction data (or all of the published function instruction data), and uses a pointer to search the read data. The computing device can set a pointer to the start of the read instruction data, and can use the pointer to iteratively search through the data for the identifier. For example, the computing device can begin by searching at the initial location pointed to by the pointer (e.g., by comparing one or more bytes of the identifier), and if there is no match, the computing device can increment the pointer to the next memory location, and so on.

Referring to step 306, the computing device searches for the private function identifier in the data read from the data file. Referring to FIG. 4, for example, the computing device searches for the signature pattern "ff,75,08,e8," indicated by reference character 406. In some embodiments, the computing device receives the identifier for the private function (e.g., from input device 108). For example, the computing device can store the identifier (or a set of identifiers) in a database (e.g., database 114). In some embodiments, the computing device stores the private function identifier in compiled code (e.g., in memory). In some embodiments, the computing device calculates the identifier. For example, the computing device can process a data file (e.g., byte code) that includes a published function associated with the private function, and identify the call to the private function. The computing device can use the identified call as the signature for the private function, and use the signature to search for the private function call in subsequent executions.

In some embodiments, the computing device executes a linear search algorithm to search for the private function identifier in the data. For example, the computing device can compare the data one byte at a time, until a byte matches the first byte of the private function identifier. Once the first byte is found, the next byte from the instruction data is compared with the next byte of the identifier, and so on, until the full pattern/signature is found. In some embodiments, the whole private function identifier is matched at each memory location. For example, assume the memory signature is 4 bytes long. From the start of the public function, the computing device checks for all four bytes at each memory location at once, instead of checking byte-by-byte. Referring to FIG. 4, for example, a pointer first points to memory location $762acc63_{16}$ (indicated by reference character 402) and tests the next four bytes for the signature ff7508e8 (indicated by reference character 406). It doesn't match, so the computing device advances the pointer one byte and checks the next four bytes at once, etc. The computing device continues until the pointer reaches memory location $762acc85_{16}$, where the signature pattern matches.

In some embodiments, the computing device can first search a predetermined location for the identifier in the published function. The computing device can store an expected offset of where the signature is expected to be located in the public function. For example, if the computing device identifies the signature at a same offset for a predetermined number of times, the computing device can learn from such patterns and begin the search at the expected location. If the computing device does not find the signature at the predetermined location, the computing device can continue searching from the beginning of the public function.

In some embodiments, the computing device uses other searching algorithms besides and/or in addition to a linear searching algorithm. For example, the computing device can use a Boyer-Moore algorithm, a Horspool algorithm, a Set-Wise Boyer-Moore algorithm, a Wu-Manber algorithm, and/or any other appropriate algorithm to identify the private function.

In some embodiments, the computing device can use different identifiers (e.g., signature patterns) to search for and/or identify the private function. For example, if there are different versions of the exported data files (e.g., the DLL files), different identifiers can be used to search for the private function. For example, the read data can be searched for each identifier until one is matched (or the function returns). A list of the signatures can be stored and updated, and the list can be read each time the computing device executes the search function. For example, instead of hard coding the signatures into the searching code, the signatures can be read from a configuration file.

Referring to step 308, the computing device stores an address of the private function. The address can be determined based on the data associated with the public function. For example, referring to FIG. 4, following the signature for the private function ("ff,75,08,e8") is the address offset of the private function "9d7cfcff." From this address offset, the address of the private function can be determined. For the present example, the windbg debugger calculated the address in the last column as $7627492a_{16}$, as indicated by reference character 408. The computing device can store the address $7627492a_{16}$ (408) (e.g., in database 114). Other programs can use the determined private function address to hook to the function, where otherwise the address of the private function cannot be determined from the data file (e.g., and therefore programs could not hook to the private function).

One skilled in the art can appreciate that the private function address can be calculated in a number of different ways. For example, the address can be pre-computed, computed using an automated computer program, and/or computed using the help of a debugger (e.g. windbg, as described above). For example, the computing device can execute computer code configured to determine the private function address. Once the computing device finds the private function signature in the public function, the current memory location (e.g., of the pointer) is at the end of the private function signature pattern. Referring to FIG. 4, the next memory location after memory location $762acc88_{16}$, which is the memory address for "e8" of the signature pattern ff7508e8 (indicated by reference character 406), is $762acc89_{16}$ (not shown), which includes "9d." The next four bits, starting at this location, are "9d7cfcff." The computing device can use the 9d7cfcff to determine the address of the private function ($7627492a_{16}$). For example, assume the byte order is 'little endian' (e.g., for Microsoft Windows), so the offset address as written in memory is least to most significant byte. Therefore, the offset address is written 'backwards' in groups of two characters, such that 9d 7c fc ff is actually written as ff fc 7c 9d. The number ff fc 7c 9d is the offset stored as a signed value, which in decimal is −230243. Since this is a negative offset, the private function is located before the public function.

For the example shown in FIG. 4, the command to call the private function is actually in the last byte of the signature, "e8." The command e8 is a "call, relative to next instruction." Therefore, the computing device adds the size of the instruction, in our example 32 bits (or 4 bytes), which makes the address $762acc89_{16}+4_{16}=762acc8d_{16}$. The computing device applies the offset to the address such that $762acc8d_{16}$+offset of−230243=private function address=$7627492A_{16}$. This example is intended to be illustrative only, and not limiting, as numerous methods can be used to determine the private function address (e.g., based on system characteristics, such as 'big endian,' etc.).

In some embodiments, the stored address for the private function is a relative offset rather than an absolute offset. For example, for some processors if the processor receives the instruction e8, the following data is an address which is relative to the next instruction, whereas if the processor receives the instructions FF or 9A, then the address is an absolute value. However, in other examples the call instruction can be an absolute address. In some embodiments, the process can be configured such that the type of call (e.g., whether the call is made with an absolute or relative address) is determined at runtime, and the relative or absolute address is then handled correctly. Different strategies can be used to determine the private function address based upon the instruction used to call the private function. Referring to FIG. 4, the computing device detected a relative call instruction (or opcode) e8, which specifies a relative address, so the computing device calculates the address of the private function relative to the current position. If the instruction is a call instruction/opcode which specifies an absolute address, then the calculations to find the private function address will be different.

In some embodiments, the program that will hook to the private function can also calculate the address of the private function, or a separate program can be created to identify the address of the private function, which can then be read and used by the program to hook to the private function. For example, a program can incorporate methods that are configured to identify the private function address. As another example, a program can be configured to read a shared data file that stores the private function's address (which are calculated by a separate program).

In some embodiments, the address of the private function is determined after the software program is compiled. For example, since the computerized method 300 is configured to dynamically identify the private function's address, programs that will identify and/or hook to the private function do not need to store the private function's address at compile time. As a result, the search function can work even if the content of the data file changes. For example, as programs are developed, the associated data files often change as well. Such changes can occur to generate new versions, fix software bugs, perform software updates, and/or the like. Since the private function search is dynamic, the search can tolerate some changes to the data files (or byte code) while still identifying the private function. For example, the search function can identify the private function even if the size of the data files change, the content of the data files change, etc.

Referring further to step 308, the computing device can verify that the target private function address is correct. For example, the computing device can check the memory at the target private function address against a predetermined signature pattern for the private function's instruction data. For example, the signature (or identifier) can be a particular number of bytes of the private function instruction data, a particular series of code steps, and/or the like.

FIG. 5 is an exemplary diagram of a portion of assembly instructions 500 for a private function, in accordance with some embodiments. Referring to FIG. 4, the computing device identified the address for the private function as $7627492a_{16}$, as indicated by reference character 408. The computing device can proceed to that address, indicated by reference character 502. The computing device can search for various signatures within the assembly instructions 500 to verify that the computing device identified the proper private function. For example, the computing device can search for "8bff" to verify it identified the correct private function, indicated by reference character 504. In some embodiments, the computing device can store, for example, various different signatures for the private function, which can be predefined in the code and/or read from a file so they can be modified without recompilation. In some embodiments, a hash of the private function's instruction data, or a portion thereof, can be used as the identifier (e.g., which can be generated by using secure hash algorithms such as SHA-1, the message-digest algorithm MD5, etc.).

If, for example, the computing device determines that the assembly instructions 500 do not match the signatures, the computing device can determine that the identified address for the private function is wrong. In some embodiments, upon determining that the private function instruction data is incorrect, the searching function can return to step 304 to read more data, and continue to search for other matches for the private function at step 306. In some embodiments, the searching function can go to step 312 and end the search.

Referring to step 310, if the end point data is not identified, then the searching method 300 returns to step 304 and continues searching (e.g., by reading additional data and/or by incrementing a pointer to the data). The computing device can store end point location data that identifies the end of the exported function. For example, the termination of the search can be triggered by identification of the return signature pattern. Referring to FIG. 4, the return signature pattern is "c2, 28, 00," which is indicated by reference character 410. If, for example, the signature pattern for the private function was not located in the assembly code 400, then upon detection of the return signature pattern, the search would terminate (e.g., instead of continuing beyond the code associated with the public function of interest). While the signature is shown as four bytes, the signature can be any length.

In some embodiments, the searching method 300 can use a maximum search length that defines the maximum amount of data that will be read (e.g., via the loop to step 304) before the search function terminates without identifying the private function (e.g., via step 312). While the techniques disclosed herein can work even if the data files change, if the data files (e.g., binary modules, such as the DLL files) change too much such that the identifier for the private function changes, and/or the identifier for the end of the exported function changes, then the searching method can be configured to stop based on the maximum search length. The maximum search length can be configured to stop the searching method before reading to the end of the data file, which can increase the system's performance in the case of failure to identify the private function. As an example, a maximum search length can be set to 200 bytes, such that after 200 bytes are read, the search terminates if there is no identification.

Once the computing device identifies the private function address, the address can be used to hook to function calls of the private function. For example, referring to FIG. 2, the internal function identification program 210 (or any other program) can hook to the private function 208 using the identified address. For example, a software program can intercept a call of the private function 208. The software program can prevent execution of the private function 208, execute a custom function in place of the private function 208, execute other function in addition to the private function 208, and/or the like.

In some examples, it is desirable to hook to a private function when a previously published function was used but is replaced in a later version with a private function. For example, if a program is hooking to a published function in a particular version of software, and the published function is changed to a private function (e.g., in a subsequent version of the software), the program may no longer be able to properly execute since it can no longer hook to the published function. The address of the new private function can be identified using the techniques described herein, so that the program can still hook to the function (even though it is now private).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A computerized method for determining an address of a private function, the method comprising:
   determining, by a computing device, a start address for a public function of a software program in a data file associated with the software program, wherein the public function is an exported function of the software program;
   identifying, by the computing device, instruction data for the public function in the data file based on the start address of the public function;
   reading, by the computing device, first data of a predetermined size from a beginning of the instruction data for the public function;
   identifying, by the computing device, a signature for a private function of the software program in the first data, wherein the private function is not an exported function of the software program but is instead an internal function of the software program; and
   storing, by the computing device in memory, a relative address for the private function in the data file based on the identified signature.

2. The method of claim 1, further comprising:
   receiving data indicative of the signature for the private function, wherein the signature is identified from assembly code associated with the software program; and
   determining the predetermined size based on the signature.

3. The method of claim 1, wherein identifying comprises:
   searching the first data for the signature of the private function;
   determining the signature is not contained within the first data; and
   searching the first data for end point data indicative of an end of the instruction data for the public function.

4. The method of claim 3, further comprising:
   identifying the end point data within the first data; and
   returning data indicative of the signature not being located in the instruction data of the public function.

5. The method of claim 3, further comprising:
   determining the end point data is not contained within the first data; and
   reading second data of the predetermined size from a next location of the instruction data in the data file.

6. The method of claim 1, further comprising:
   intercepting a call of the private function by the software program; and
   executing a custom function of a second software program in place of the private function.

7. The method of claim 6, further comprising determining the address of the private function after the second software program is compiled.

8. The method of claim 1, wherein determining the start address comprises determining the start address based on a table in the data file, wherein the table lists a set of public functions for the software program.

9. The method of claim 1, wherein the data file comprises byte code that defines public computer functions for the software program, private computer functions for the software program, or both, wherein:
   identifying comprises identifying a set of byte code in the data file comprising instruction data for the public function based on the start address of the public function;
   reading comprises reading the predetermined size of byte code from the beginning of the set of byte code for the public function; and
   identifying comprises identifying the signature for the private function of the software program in the read predetermined size of byte code.

10. A server for determining an address of a private function, the server comprising:
    a database; and
    a processor in communication with the database, and configured to run a module stored in memory that is configured to cause the processor to:
       determine a start address for a public function of a software program in a data file in the database associated with the software program, wherein the public function is an exported function of the software program;
       identify instruction data for the public function in the data file based on the start address of the public function;
       read first data of a predetermined size from a beginning of the instruction data for the public function;
       identify a signature for a private function of the software program in the first data, wherein the private function is not an exported function of the software program but is instead an internal function of the software program; and
       store, in the memory, a relative address for the private function in the data file based on the identified signature.

11. A non-transitory computer readable medium having executable instructions operable to cause an apparatus to:
    determine a start address for a public function of a software program in a data file associated with the software program, wherein the public function is an exported function of the software program;
    identify instruction data for the public function in the data file based on the start address of the public function;
    read first data of a predetermined size from a beginning of the instruction data for the public function;
    identify a signature for a private function of the software program in the first data, wherein the private function is not an exported function of the software program but is instead an internal function of the software program; and
    store in memory a relative address for the private function in the data file based on the identified signature.

12. The non-transitory computer readable medium of claim 11, wherein the instructions are further operable to cause an apparatus to:
    receiving data indicative of the signature for the private function, wherein the signature is identified from assembly code associated with the software program; and
    determining the predetermined size based on the signature.

13. The non-transitory computer readable medium of claim 11, wherein the instructions are further operable to cause an apparatus to:
    searching the first data for the signature of the private function;
    determining the signature is not contained within the first data; and
    searching the first data for end point data indicative of an end of the instruction data for the public function.

14. The non-transitory computer readable medium of claim 13, wherein the instructions are further operable to cause an apparatus to:
    identifying the end point data within the first data; and
    returning data indicative of the signature not being located in the instruction data of the public function.

15. The non-transitory computer readable medium of claim 13, wherein the instructions are further operable to cause an apparatus to:

determining the end point data is not contained within the first data; and reading second data of the predetermined size from a next location of the instruction data in the data file.

16. The non-transitory computer readable medium of claim 11, wherein the instructions are further operable to cause an apparatus to:

intercepting a call of the private function by the software program; and executing a custom function of a second software program in place of the private function.

17. The non-transitory computer readable medium of claim 11, further comprising determining the address of the private function after the second software program is compiled.

18. The non-transitory computer readable medium of claim 11, wherein determining the start address comprises determining the start address based on a table in the data file, wherein the table lists a set of public functions for the software program.

\* \* \* \* \*